Patented June 26, 1923.

1,460,012

UNITED STATES PATENT OFFICE.

LUDWIG BEREND, OF AMONEBURG, NEAR BIEBRICH-ON-THE-RHINE, GERMANY.

METHOD OF PREPARING COLLOIDAL METALS AND METALLOIDS AND COMPOUNDS OF SAME.

No Drawing. Application filed June 28, 1920. Serial No. 392,535.

*To all whom it may concern:*

Be it known that I, LUDWIG BEREND, citizen of Germany, residing at Landgrabenweg 14, Amoneburg, near Biebrich-on-the-Rhine, in Hesse, Germany, have invented new and useful Improvements in Methods of Preparing Colloidal Metals and Metalloids and Compounds of Same (for which I have filed an application in Germany Oct. 9, 1916), of which the following is a specification.

It is a well known fact that it is possible to bring metals and metalloids and also the insoluble compounds of both kinds of bodies in a colloidal state by different methods, that is to say in a state of so fine a division of parts that such parts cannot be observed with the naked eye when the colloidal metals, metalloids or their insoluble compounds are divided within a diluent. They also do not precipitate out in such a diluent and cannot be separated therefrom by the ordinary methods of filtration. Certain metals, especially of the series of the heavy metals and metalloids resembling metals such as arsenic, antimony and the like as well as their compounds have proved to show exceedingly high efficacy when employed in the colloidal form for many purposes, especially for medical purposes, for the fighting of every kind of plant disease (noxious animal and vegetable parasites of plants) and for the protection of wood. But the use of these metallic elements and compounds in the colloidal form for such purposes up to the present time has been very limited as the known methods for bringing said elements of metallic character and their insoluble compounds in the colloidal state were comparatively complicated and expensive.

Now I have found that is is possible to attain this purpose in a very economical manner by treating certain inorganic substances for a considerable time at temperatures above 100° cent. with the waste liquor resulting from the manufacture of cellulose from wood, hereinafter called cellulose waste liquor. The cellulose waste liquor in this case serves as a so-called protective colloid.

The cellulose waste liquor as is well known also possesses reductive properties. When employing reducible compounds of metal or metal like metalloids as starting materials for the present process, it is therefore possible to combine the colloid forming effect of the cellulose waste liquor with its reductive action. Thus reducible solutions of the metallic salts may be treated at temperatures above 100° cent. with waste sulphite liquor from the cellulose manufacture (hereinafter called waste sulphite liquor) for preparing these metals or the corresponding protoxides in colloidal form. When doing so it is advantageous to neutralize the acid disengaged in this process by an addition of caustic alkali or hydroxides of the alkaline earth metals. In this manner it is possible to obtain copper, silver, mercury, arsenic and other heavy metals and metal like metalloids and insoluble compounds thereof in colloidal form.

In order to obtain metals or metal protoxides according to this process, the metal salt solutions are heated preferably in the presence of caustic alkali with a considerable quantity of waste sulphite liquor, until the desired stage of reduction and the colloidal state are obtained, when the resulting colloidal mass (gel) is precipitated by any known method.

Similarly such compounds of metals or metalloids as are insoluble in water or the metals or metalloids themselves may be treated in as finely divided a state as possible with cellulose waste liquors, preferably waste sulphite liquor, most intimately and thoroughly while heating at a temperature above 100° cent. until the materials are obtained in the colloidal state. The roundabout way, passing over the solutions of metal salts or the like and their precipitation with alkalis or the like, is avoided in this way. This second method may be carried out if desired under increased pressure.

Also in this process the reducing effect of the cellulose waste liquor may be utilized simultaneously; for instance the colloidal protoxide or the metal itself can be obtained in this way by treating copper oxide or copper hydroxide with waste sulphite liquor while heating at a temperature above 100° cent. The oxides or sulphides of various elements of metallic character, such as mercury, silver, cerium, arsenic, etc., can in a corresponding manner be obtained in a colloidal condition, but not the oxides of bases such as magnesium, zinc and the like.

In both of these methods there can be used either the waste liquor resulting from the manufacture of cellulose by means of sulphurous acid (waste sulphite liquor) or that resulting from such manufacture by means of caustic soad liquor (waste caustic soda liquor), either in a crude or in a purified condition. For preparing colloidal products for medical purposes the waste liquor firstly should be freed in some way or other from any lime, iron, free acid, etc., contained therein and then concentrated in a vacuum according to well known methods.

The range of application of the prepared colloidal products is unlimited and comprises for instance medicine, veterinary surgery, cosmetics, protection of plants, tanning, impregnation of wood, fabric, and so on.

The colloidal substances obtained according to this invention can be used either per se or in conjunction with oil-, resin- and other organic emulsions or cellulose waste liquors.

Convenient additions, such as, e. g., other reductive agents, colloids, filling-substances, etc., can, if desired, properly be used in connection with this process.

When the colloidal products are to be employed as protective agents for plants,—in the form of solutions for spraying in a similar manner to the generally known copper-lime liquid or the like—, there are preferably used, in order to increase adhesion of the colloidal products on vegetable parts and to reduce the solubility in water, additions of voluminous inorganic substances, such as aluminium hydrate, gypsum, barium carbonate, lime, etc., or mixtures of the same, such as have long been employed in many forms for fighting vine diseases, mostly in conjunction with copper sulphate. On account of the extremely high fungicidal effect of the colloidal substances here described, which is greatly superior to that of ordinary metal salts, weak copper-lime liquids can in certain cases, e. g. in fighting vine diseases, be reinforced by an addition of slight amounts of the colloidal toxic substances obtained according to the present invention, the copper-lime mixture increasing at the same time the adhesion of the colloidal substances.

When the prepared colloidal substances are to be used for medical purposes, it may prove convenient to free them from ballast substances, especially of an inorganic kind, derived from the cellulose waste liquors or added while precipitating the insoluble compounds, and this can be done by dialysis.

The following more detailed description illustrates by way of examples how the process of the present invention can be performed.

*Examples.*

(1) 100 grams of waste sulphite liquor are firstly neutralized with lime and separated from any precipitated gypsum by filtration. The filtrate is heated with 100 grams of a 10% mercury chloride solution, preferably with an addition of caustic soda or caustic potash solution, until the metallic mercury formed thereby has been perfectly brought into a colloidal condition. The quantity of caustic soda or caustic potash solution employed is to be chosen in such a manner, that the solution thereby will obtain basic character. By inspissating the liquid under reduced pressure or precipitating with alcohol or in some other known manner, the colloidal mercury thus produced can be obtained in separated condition.

(2) 100 grams of copper sulphate are dissolved in 400 grams of waste sulphite liquor, the solution is brought to neutral reaction with lime or barium hydrate, any sulphates precipitated thereby are filtered off and the filtrate is heated after the gradual addition of 100 grams of a 10% caustic soda solution until the firstly separated copper hydroxide is reduced and converted into colloidal copper protoxide or by protracted action of heat and of the reducing agent i. e. the waste sulphite liquor into colloidal metallic copper. These products also can be separated from the salt solution according to the well known methods, i. e. precipitation with alcohol or by dialysis.

(3) 60 grams of potassium bi-chromate are dissolved in 500 grams of waste sulphite liquor, the solution is neutralized with lime and, after separating from the precipitated gypsum, is heated with an addition of 150 grams of 30% caustic soda solution, until all the bi-chromate has been converted into colloidal chrome hydroxide.

(4) 100 grams of copper oxide are rubbed and mixed most intimately with a mixture of 50 grams of waste soda liquor and 50 grams of waste sulphite liquor (concentrated to a consistency of about 30° Bé.), the whole mixture then is heated while stirring in a closed vessel to about 110° C., until an homogeneous material of completely colloidal nature is obtained, that can be colloidally dissolved and diluted with any quantity of water.

(5) 50 grams of red mercury oxide are heated with 25 grams of an extract obtained by fractionated precipitation with salts from waste sulphite liquor and 60 grams of water in an autoclave, while stirring, until the red mercury oxide has been completely converted into colloidal metallic mercury.

(6) 10 grams of a concentrated waste sulphite liquor, brought to strong alkaline reaction by addition of soda-lye and 20 grams of water are intimately mixed with 10 grams of freshly precipitated silver oxide and this mixture is heated while stirring during two hours in a vessel with a return condenser to about 110° C., until a perfectly homogeneous mass of colloidal metallic silver has been produced, which in the well known manner may be cleansed by dialysis.

(7) To 100 grams of the colloidal copper product obtained according to example 4 are added 100 grams of aluminium sulphate dissolved in 500 grams of water. The mass is stirred until a homogeneous colloidal solution has been produced. An emulsion of 100 grams of burnt lime in 400 grams of water is added thereafter.

The aluminium sulphate may also be added to the mixture of copper oxide and cellulose waste liquor before producing the colloidal copper product according to example 4.

(8) 1 kg. of crystallized copper sulphate and 100 grams of the colloidal copper product obtained according to example 4 are dissolved in water in the usual manner, and after adding calcium hydroxide until neutral reaction of the fluid is obtained, there is added such a quantity of water as to obtain 100 liters of solution.

(9) Sulphuretted hydrogen is introduced into a solution of 1 part of arsenious acid in 100 parts of diluted cellulose waste liquor (10 parts of concentrated waste liquor of 35° Bé. to 90 parts of water) until all the arsenious acid is transformed into colloidal sulphide of arsenic. The thus obtained product can be precipitated in a flocculent state by addition of a saturated solution of sodium chloride or it can be gained by inspissating the solution until a syrupy mass is obtained and by then adding alcohol.

Having now particularly described and ascertained the nature of my said invention, I declare that what I claim is:—

1. A process of preparing inorganic substances in colloidal form consisting in inorganic substances being treated with cellulose waste liquor while heating until the desired insoluble substance is obtained in colloidal form.

2. A process of preparing inorganic substances in colloidal form consisting in solutions of inorganic compounds being heated with precipitants in the presence of waste sulphite liquor until the insoluble substance is separated in colloidal form.

3. A process of preparing inorganic substances in colloidal form consisting in solutions of metal compounds being heated with precipitants in the presence of waste sulphite liquor until the insoluble substance is separated in colloidal form.

4. A process of producing inorganic substances in colloidal form consisting in reducible compounds of metals being heated with waste sulphite liquor in the presence of caustic alkali and treated therewith until the desired reduced products are obtained in colloidal form.

5. A process of producing inorganic substances in colloidal form consisting in reducible compounds of metals being heated with waste sulphite liquor and caustic alkali in the presence of other reductive agents until the desired reduced products are obtained in colloidal form.

6. A process of producing inorganic substances in colloidal form consisting in solutions of reducible compounds of metals being heated and precipitated with waste sulphite liquor in the presence of caustic alkali until the desired reduced products are obtained in colloidal form.

7. A process of preparing inorganic substances in colloidal form consisting in metal compounds being treated with cellulose waste liquor while heating until the desired insoluble substance is obtained in colloidal form, whereupon precipitants are added.

8. A process of preparing inorganic substances in colloidal form consisting in metal compounds being treated with cellulose waste liquor while heating until the desired insoluble substance is obtained in colloidal form, whereupon it is precipitated by the addition of alcohol.

9. A process of preparing inorganic substances in colloidal form consisting in inorganic substances, that are insoluble in water being treated in finely divided state with cellulose waste liquor while heating until conversion into the colloidal form has taken place.

10. A process of preparing inorganic substances in colloidal form consisting in inorganic substances, that are insoluble in water being heated with cellulose waste liquor under pressure until they will form a colloidal suspension with water.

11. A process of preparing inorganic substances in colloidal state consisting in metal compounds being treated with cellulose waste liquor while heating until the desired insoluble substance is obtained in colloidal form, adding voluminous insoluble inorganic substances thereto.

12. A process of preparing inorganic substances in colloidal form consisting in metal compounds being treated with cellulose waste liquor while heating until the desired insoluble substance is obtained in colloidal form, and mixing copper-lime therewith.

13. A process of producing heavy metals in a colloidal form consisting in treating their compounds with cellulose waste liquor while heating until the metal is separated in a colloidal form.

In testimony whereof I have hereunto set my hand in presence of two subscribing witnesses.

LUDWIG BEREND.

Witnesses:
G. FLESCH,
H. R. SOMMERHOFF.